June 27, 1967     N. J. PANZICA ETAL     3,328,009
GAS WASHING APPARATUS
Filed June 18, 1965     3 Sheets-Sheet 1
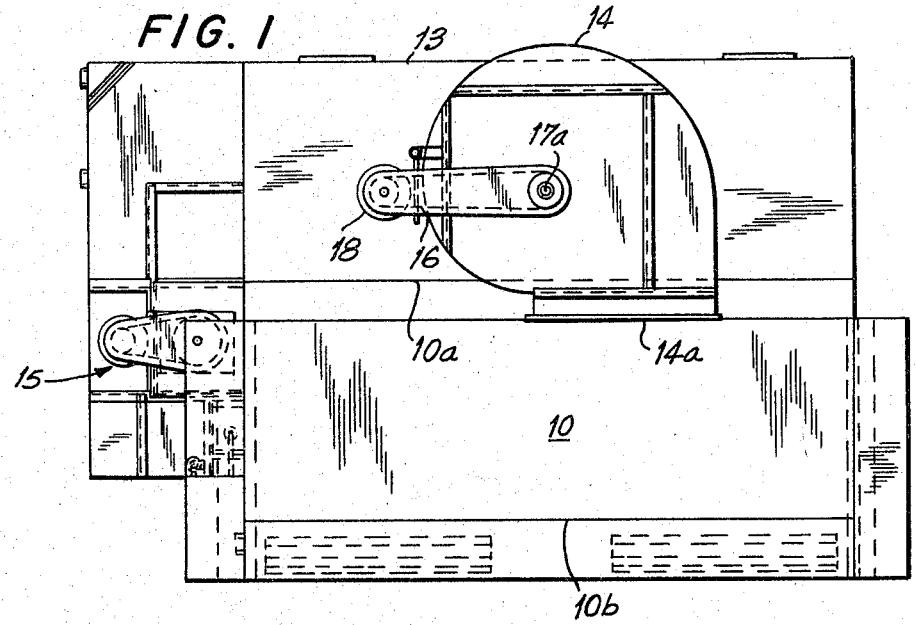
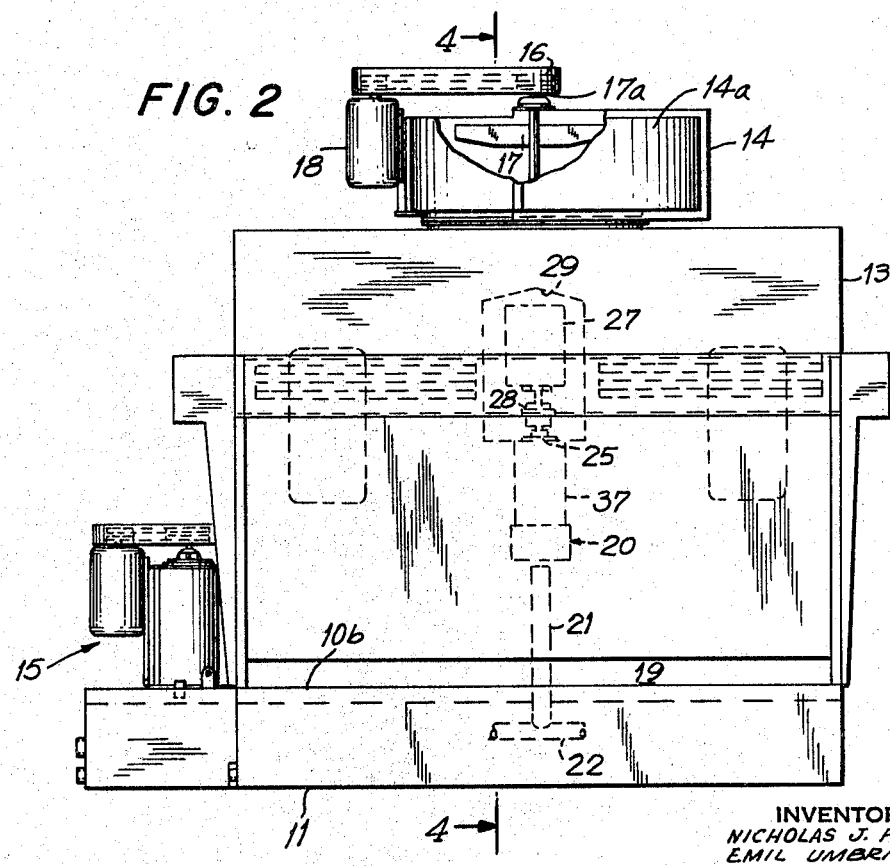
INVENTORS
NICHOLAS J. PANZICA
EMIL UMBRICHT
BY ROBERT M. JAMISON
Curtis, Morris & Safford
ATTORNEYS

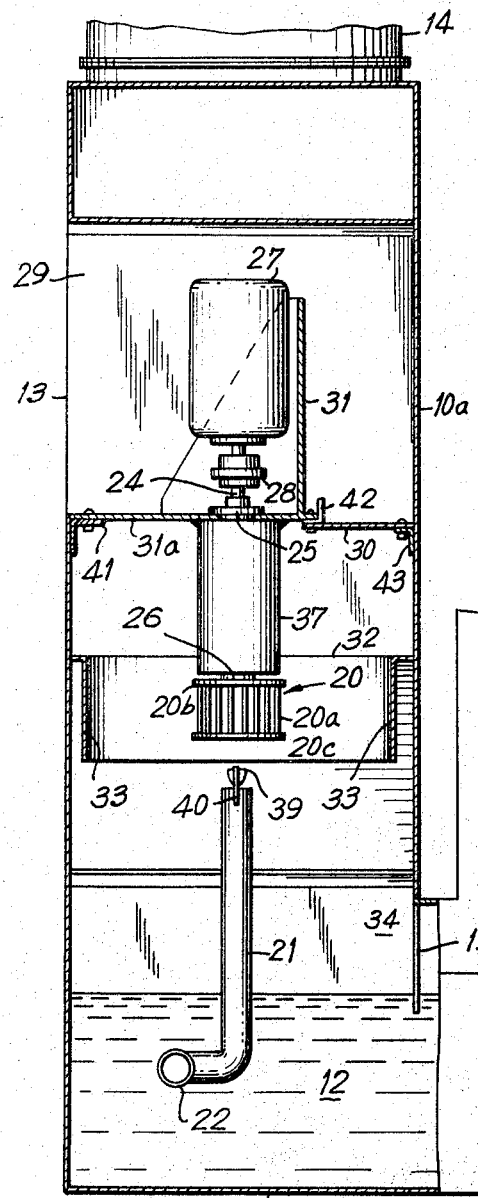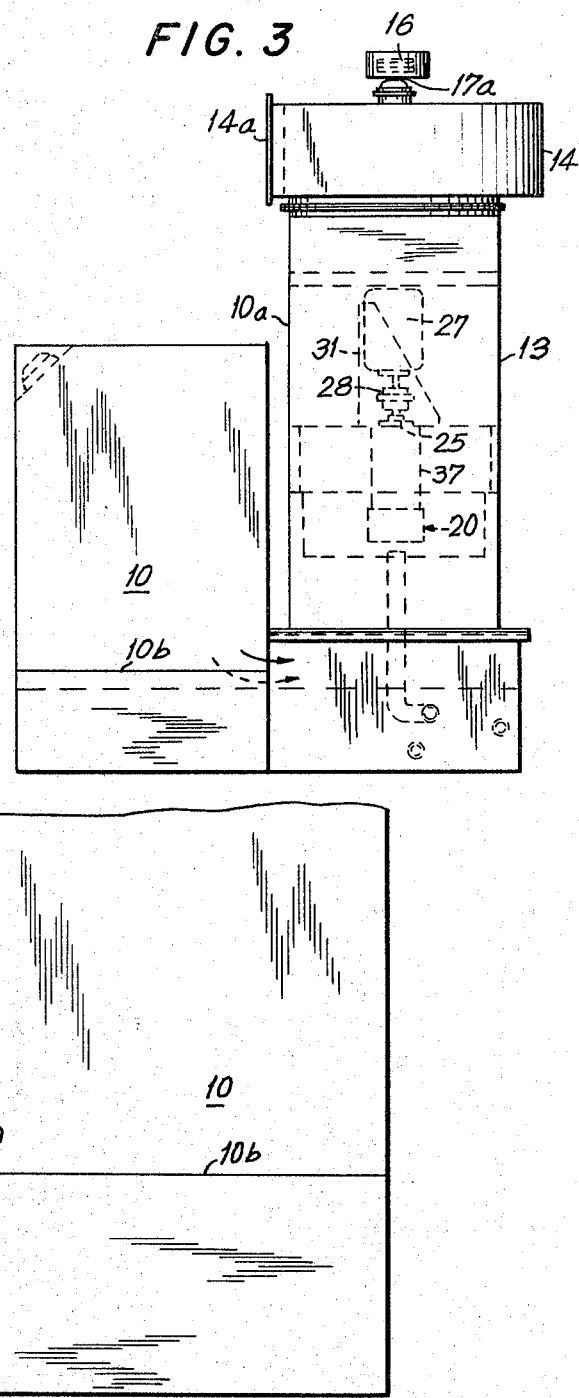

June 27, 1967 N. J. PANZICA ETAL 3,328,009
GAS WASHING APPARATUS
Filed June 18, 1965 3 Sheets-Sheet 3

INVENTORS
NICHOLAS J. PANZICA
EMIL UMBRICHT
BY ROBERT M. JAMISON

Curtis, Morris & Safford
ATTORNEYS

United States Patent Office 3,328,009
Patented June 27, 1967

---

3,328,009
GAS WASHING APPARATUS
Nicholas John Panzica, Detroit, Emil Umbricht, Northville, and Robert MacDonald Jamison, Detroit, Mich., assignors to Ajem Laboratories, Inc., Livonia, Mich.
Filed June 18, 1965, Ser. No. 465,001
5 Claims. (Cl. 261—29)

The present invention relates to gas washing apparatus having particular application for capturing and removing paint particles and aerosols entrained in a stream of air drawn from a paint spray booth. Although the invention will be described in this environment, it will be readily apparent that the invention has considerably broader application and may be employed for various other purposes where dust and other foreign particles must be removed from the atmosphere.

When using a paint spray booth, it is important that the airborne paint particles originating from a spray gun be drawn away from both the worker and the object being painted. It is also important to prevent the airborne paint particles from being scattered over the nearby environment such as beyond the paint spray booth proper. Normally, the particle laden air is drawn away from the spraying area and passed through a washing apparatus which removes the paint particles. The pure air is then exhausted into the atmosphere. It is of particular importance that the washing apparatus performs efficiently and removes the airborne paint particles so as to prevent paint particles from being scattered over the immediate vicinity where the air is exhausted into the atmosphere. If the washing apparatus is inefficient so that much of the paint particulate matter remains in the air which is exhausted into the atmosphere, much damage may be done, for example, to building surfaces and automobiles located near the exhaust. Paint particulate matter falling on human beings will result in at least discomfort and inconvenience and in some cases personal injury.

Many of the prior art paint spray booths furnished with gas washing apparatus have not been sufficiently efficient in the removal of paint particulate matter from the air drawn from the paint spray booth proper. Besides causing the types of damage mentioned above, such booths have been found to develop large buildups of paint in the areas of the exhaust fan and exhaust ducts. A high accumulation of paint in the area of the exhaust fan may create a fire hazard.

Other paint spray booths having more efficient gas washing apparatus require an excessive amount of space for the spraying area and the washing apparatus. In addition, these paint spray booths have been found to be relatively expensive to fabricate.

It is an object of the present invention to provide a new and improved gas washing apparatus.

It is another object of the present invention to provide a gas washing apparatus which is highly efficient in removing paint particles from a stream of air drawn through the apparatus.

It is a further object of the present invention to provide a gas washing apparatus which requires a minimum amount of space.

It is yet another object of the present invention to provide a gas washing apparatus which may be manufactured at a reasonable cost.

Gas washing apparatus constructed in accordance with the present invention includes a tank for holding a washing liquid and spraying means for developing a spray pattern of washing liquid droplets for washing entrained matter from a stream of gas passing through the spray pattern. The spraying means are disposed above the tank in which the washing liquid is held so that the washing liquid droplets fall into the tank. The apparatus of the invention further includes means for supplying the washing liquid to the spraying means to develop the spray pattern and a confining chamber surrounding the spraying means and having an inlet for receiving the stream of gas and a sloping ceiling forming an outlet for the stream of gas. The inner surface of the ceiling serves to guide the stream of gas into the spray pattern and out through the outlet and the outer surface of the ceiling serves to drain into the tank washing liquid droplets which are carried by the stream of gas out of the confining chamber.

For a better understanding of the present invention, together with other and further objects thereof, reference is made to the following description, taken in connection with accompanying drawings, and its scope will be pointed out in the appended claims.

Referring to the drawings:

FIGURE 1 is a top view of a paint spray booth having gas washing apparatus constructed in accordance with the present invention;

FIGURE 2 is a front elevation view of the paint spray booth of FIGURE 1;

FIGURE 3 is a side elevation view of the paint spray booth of FIGURE 1;

FIGURE 4 is an enlarged sectional view taken along line 4—4 of FIGURE 2 showing the details of the gas washing apparatus constructed in accordance with the present invention;

Figure 5:
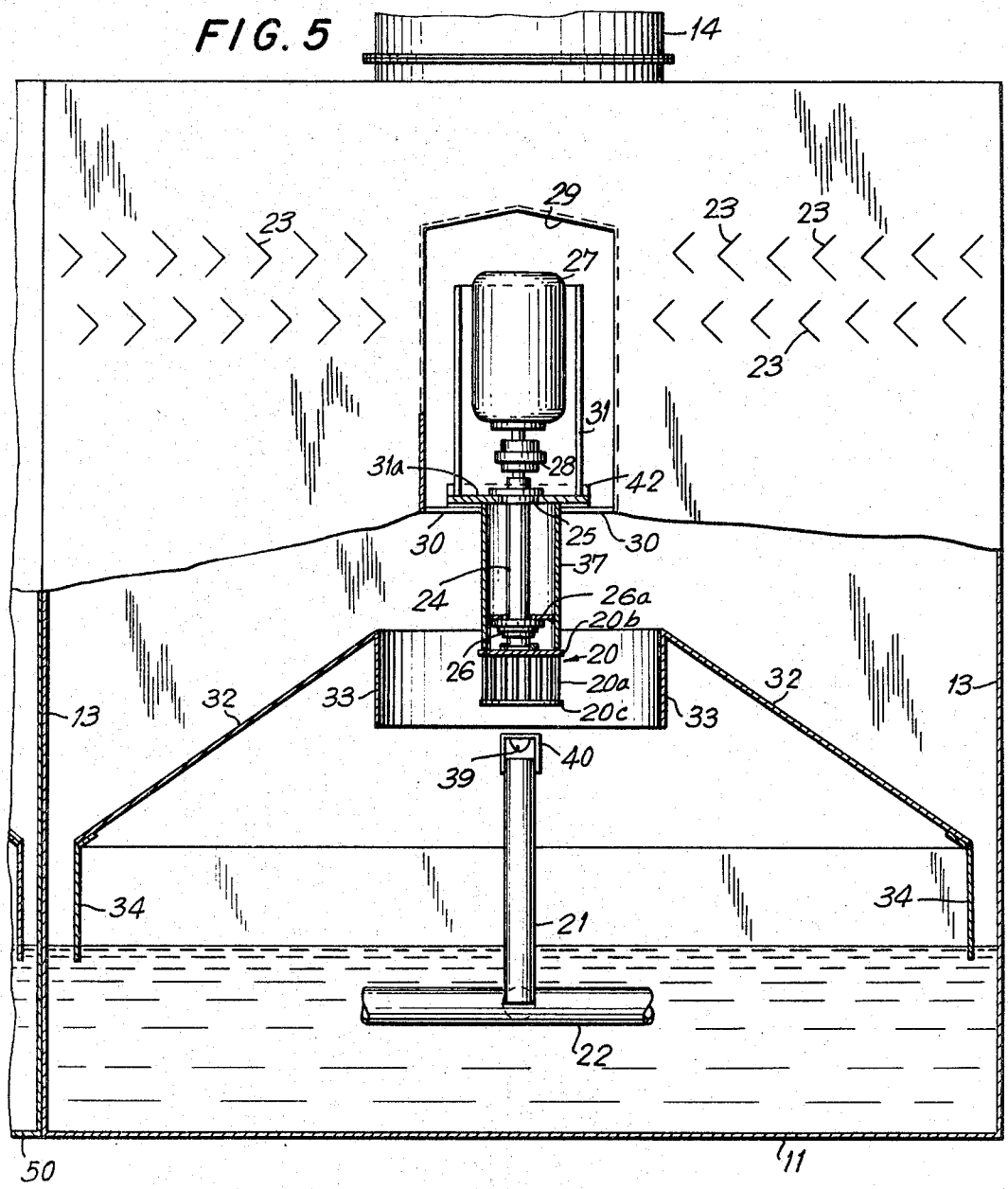
FIGURE 5 is a rear elevation view of the gas washing apparatus constructed in accordance with the present invention.

The major portions of the paint spray booth illustrated in FIGURES 1 through 4, inclusive, are a paint spray area 10, a tank 11 for holding a washing liquid 12, a shell 13 for housing the gas washing apparatus of the invention, a shell 14 for housing an exhaust fan 17, and a pumping system 15 for circulating the washing liquid 12. The tank 11 is located below the paint spray area 10 and the gas washing apparatus shell 13 and extends from the front of the booth to the rear of the booth. The exhaust fan 17 within the shell 14 is driven by means of a belt drive 16 connected between the drive shaft 17a of the fan and a motor 18. The exhaust fan 17 is effective in drawing paint particle laden air, the result of overspray paint materials, from the paint spray area 10 into the washing apparatus shell 13 through an elongated opening 19 in the rear wall 10a of the spray area 10 in the direction of the solid arrow shown in FIGURE 3. The opening 19 extends throughout the length of the paint spray area 10. The floor 10b of the paint spray area 10 may be in the form of a grating which permits particle laden air to be drawn through the floor into the washing apparatus shell 13 as indicated by the dotted arrow in FIGURE 3.

The pumping system 15 serves to pump the washing liquid 12 up through a pipe 21 to a spray generator designated generally by reference numeral 20. The spray generator 20 develops a spray pattern of washing liquid droplets for washing the air stream drawn into the washing apparatus shell 13. As will be brought out in more detail below, the spray generator 20 is disposed above the tank 11 so that the washing liquid droplets fall into the tank. The washing liquid is cleaned by filtering or by floatation of the paint particles and surface skimming or by the paint particles settling at the bottom of the tank. The cleaned washing liquid is recirculated through pipes 21 and 22 by the pumping system 15 to the spray generator 20. It will be apparent that it is not necessary in the present apparatus to recirculate the washing liquid, but that recirculation can be accomplished economically.

The shell 13, besides housing the gas washing apparatus, also houses a plurality of eliminators 23. The eliminators serve to remove any washing liquid droplets which may be carried upwardly in the draft of air. The air then is forced outwardly by the exhaust fan 17 through an opening 14a in the exhaust fan housing 14. It is understood that the exhaust fan 17 may be located remote from the washing apparatus, for example, at an outlet leading to the atmosphere exterior to a building, in which case the air is drawn through a duct running between the opening 14a and the exhaust fan.

In addition to the gas washing apparatus contained in shell 13, the rear wall 10a of the paint spray area 10 may serve as a flood sheet for the partial recovery and removal of the overspray. The flood sheet is simply a vertical plate which is covered continuously on the forward side with a film of the washing liquid which overflows from a trough (not shown) extending along the upper edge of the wall 10a. The washing liquid is pumped into this trough, preferably by the pumping system 15, so that it flows over the forward surface of the wall 10a and is received in the tank 11. U.S. Patent 2,981,525 issued to E. Umbricht on Apr. 25, 1961, provides a more detailed explanation of such a flood sheet arrangement.

Referring to FIGURES 2 through 5, inclusive, the spray generator 20 is seen to be of the top-supported type described in detail in U.S. Patent 2,789,866 issued to E. Umbricht on Apr. 23, 1957. In particular, the spray generator 20 includes a cage having a plurality of rods 20a supported around the periphery of a disc 20b and secured at their lower ends by an annular ring 20c. The disc 20b is supported at its center by a drive shaft 24 which is secured by suitable means such as bolts, rivets or welding to the upper surface of disc 20b. The drive shaft 24 is, in turn, supported by upper and lower bearings 25 and 26, respectively. The lower bearing 26 is supported by a plate 26a to which the lower bearing is secured by suitable means. Plate 26a, in turn, is secured in position by a container 37 extending downward from a cross support 31a of a chair-like member 31. The container 37 is secured to the cross support 31a by a welding seam, for example. The plate 26a may be secured to the container 37 also by a welding seam. The seam along which the plate 26a is joined to the container 37 may be water-tight. The upper bearing 25 is secured to the cross support 31a also by suitable means. The chair-like member 31 is positioned in place by angles 41 and 42 to which the cross support 31a is secured. Angle 41 is affixed to the rear wall of the shell 13, while angle 42 is affixed to a shelf 30 extending from the inside surface of wall 10a and secured in place by an angle 43.

The shaft 24 is driven by a motor 27 which is directly coupled to the shaft through a suitable coupling device 28. By employing a direct coupling between the output shaft of the motor 27 and the drive shaft 24 instead of an indirect drive by way of belts typical of the prior art gas washers, the entire unit becomes more compact and higher rotational speeds of the spray generator 20 are possible.

The motor 27 and the coupling device 28 are located within a motor mounting recess 29 and are supported by the chair-like member 31. The motor 27 may be mounted against the vertical portion of the chair-like member 31 by suitable means such as bolts or straps. The motor mounting recess 29 opens to the rear of the unit thereby making the motor 27, the coupling device 28, the bearings 25 and 26, and the spray generator 20 readily accessible for changes, replacements or service. If only the motor 27 is to be removed, it is simply decoupled from the coupling device 28 and released from the chair-like member 31. The motor 27, coupling device 28, chair-like member 31, spray generator 20 and the bearings 25 and 26 may be removed as a unit by releasing the chair-like member from the angles 41 and 42, sliding the entire unit slightly toward the rear of the booth (to the left in FIGURE 4) and tilting the entire unit for withdrawal.

The container 37 is seen to extend downward to just above the top surface of disc 20b. The arrangement of the container 37 and the plate 26a along with a watertight seal at their line of juncture is effective in preventing washing liquid droplets from the spray pattern from entering the motor mounting recess 29.

As the washing liquid is pumped up through the pipe 21, the liquid may be deflected by a director 39 supported by a frame 40 into a conical spray. As the spray cage is rotated rapidly by the motor 27, a spray pattern of washing liquid droplets is developed by the spray generator. The spray pattern is kept within a vertically disposed washing chamber defined by the walls 33. The washing chamber may by cylindrical, rectangular, octagonal or of any other suitable cross-section. As shown in FIGURES 4 and 5, the washing chamber is square shaped extending substantially from the wall 10a to the rear wall of the shell 13. The walls 33 reduce the effective washing area as compared to presently known gas washers to bring the stream of air into close proximity to the spray generator 20. The result is a more concentrated spray pattern and an improved washing efficiency.

The washing apparatus within shell 13 also includes a confining chamber having a sloping ceiling and defined by the inclined sheets 32, the side walls 34, the wall 10a and the rear wall of the shell 13. The confining chamber has an inlet, namely, the elongated opening 19 in the wall 10a for receiving the stream of air which is to be cleaned. The confining chamber surrounds the washing chamber and, therefore, the spray generator 20. The inclined sheets 32 are joined to the outer surface of the side walls 33 of the washing chamber, while the side walls 34 of the confining chamber extend into the washing liquid in tank 11. For the particular arrangement shown in the drawings, the inclined sheets 32 and the side walls 33 are two integral units with the side walls 33 being bent downward at the outlet of the washing chamber at approximately the height of the top of the spray generator 20.

As the particle laden air is introduced into the confining chamber through the inlet 19, the bottom surfaces of the inclined sheets 32 guide the stream of air into the spray pattern developed by the spray generator 20 within the washing chamber. The air is washed in the usual manner and the droplets with captured paint particles drop downward into the tank 11. Liquid droplets which are carried out of the washing chamber fall on the top surfaces of the inclined sheets 32 and drain into the liquid of tank 11. The side walls 34 of the confining chamber by extending into the liquid 12 form a seal so that washing liquid droplets draining off of the inclined sheets 32 flow into the tank 11, but impure air is confined within the confining chamber and forced upward into the washing chamber. The stream of air moves upward past the motor mounting recess 29 into the area of the eliminators 23 and then to the exhaust fan 17 to be exhausted.

A number of points should be noted regarding the washing and confining chambers. The side walls 33 of the washing chamber may be separate from the inclined sheets 32 and joined to the inclined sheets by suitable means. The sheets 32 may be joined to the side walls 33 at any level which will provide the desired air flow patterns. The pitch of the inclined sheets 32 is variable and again determined by the desired air flow patterns. Finally, the side walls 34 of the confining chamber may be integral with the inclined sheets 32 and formed by being bent downward.

Figure 6:
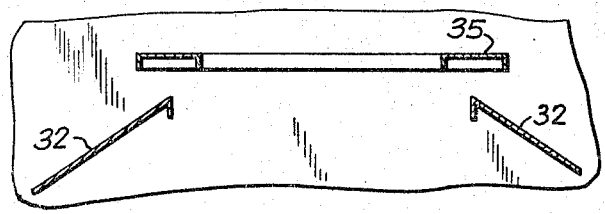
FIGURE 6 shows a modified form of the gas washing apparatus constructed in accordance with the present invention.

FIGURE 6 shows a modification which may be made to the gas washing apparatus of the invention. It is seen that the washing chamber has been omitted and that the inclined sheets 32 have been bent over only slightly. In this embodiment, the confining chamber serves also as the washing chamber. Because that portion of the confining chamber surrounding the spray generator is considerably narrower than the lower portions of the confining chamber, the advantages of reduced washing area and spray concentration are still preserved in the FIGURE 6 modification.

FIGURE 6 also shows a second modification which may be made to the gas washing apparatus of the invention. This includes the addition of a baffle 35 which prevents the washing liquid droplets from moving straight upward against the eliminators 23. Instead, any such droplets are deflected onto the top surfaces of the inclined sheets 32. The baffle 35 may be of any suitable shape such as a circular or oval ring.

It is obvious the paint spray booth illustrated in FIGURES 1 through 4, inclusive, may be positioned alongside one or more similar or different paint spray booths so that well-known production techniques may be practiced. Such an arrangement is indicated by the partially shown booth 50 in FIGURE 5.

When two or more paint spray booths are used together, a single exhaust fan, of sufficient capacity, and a suitable duct system may serve to develop the required air flow patterns for the various booths. Furthermore, for such a multiple unit arrangement, a single reservoir or settling tank and a single pumping system may be employed to provide the required washing liquid to the various units.

It will also be apparent that other types of spray generators may be employed besides the one specifically described. For example, the spray generators described in U.S. Patent 3,011,769 issued to E. Umbricht on Dec. 5, 1961 and in copending U.S. application Ser. No. 145,509, now U.S. Patent 3,235,235, may be used after suitable modifications are made to the washing apparatus. In these spray generators impeller blades extending into the washing liquid throw the liquid upwardly into the spray cage.

While there have been described what are at present considered to be the preferred embodiments of this invention it will be obvious to those skilled in the art that various changes and modifications may be made therein without departing from the invention and it is, therefore, aimed to cover all such changes and modifications as fall within the true spirit and scope of the invention.

We claim:

1. Gas washing apparatus comprising:
a tank for holding washing liquid;
spraying means for developing a spray pattern of washing liquid droplets for washing entrained matter from a stream of gas passing through said spray pattern, said spraying means disposed above said tank so that said washing liquid droplets fall into said tank;
means for supplying said washing liquid to said spraying means to develop said spray pattern;
means for moving said stream of gas through said spray pattern;
and a confining chamber surrounding said spraying means and having an inlet for receiving said stream of gas and a sloping ceiling composed of two inclined sheets extending to below said spraying means and forming an outlet for said stream of gas adjacent said spraying means, the inner surface of said ceiling guiding said stream of gas into said spray pattern and out through said outlet and said ceiling being constructed so that its outer surface drains into said tank washing liquid droplets which are carried by said stream of gas out of said confining chamber.

2. Gas washing apparatus comprising:
a tank for holding a washing liquid;
spraying means for developing a spray pattern of washing liquid droplets for washing entrained matter from a stream of gas passing upward through said spray pattern, said spraying means disposed above said tank so that said washing liquid droplets fall into said tank;

means for drawing said stream of gas through said spray pattern;
means for supplying said washing liquid to said spraying means to develop said spray pattern;
and a confining chamber surrounding said spraying means and having an inlet for receiving said stream of gas, a sloping ceiling composed of two inclined sheets extending to below said spraying means and forming an outlet for said stream of gas adjacent said spraying means and vertical walls extending downward from the lower edges of said sloping ceiling into said tank, said ceiling being constructed so that its bottom surface guides said stream of gas into said spray pattern and out through said outlet and its top surface drains into said tank washing liquid droplets which are carried by said stream of gas out of said confining chamber.

3. Gas washing apparatus comprising:
a tank for holding a washing liquid;
spraying means for developing a spray pattern of washing liquid droplets for washing entrained matter from a stream of gas passing through said spray pattern, said spraying means disposed above said tank so that said washing liquid droplets fall into said tank;
means for supplying said washing liquid to said spraying means to develop said spray pattern;
a washing chamber surrounding said spraying means through which said stream of gas passes;
means for drawing said stream of gas through said spray pattern;
and a confining chamber surrounding said washing chamber and having an inlet for receiving said stream of gas and a sloping ceiling composed of two inclined sheets extending to below said spraying means and joined to the outer surface of said washing chamber, said confining chamber so positioned relative to said washing chamber that the inner surface of said ceiling guides said stream of gas into said washing chamber and the outer surface of said ceiling drains into said tank washing liquid droplets which are carried by said stream of gas out of said washing chamber.

4. Gas washing apparatus comprising:
a tank for holding a washing liquid;
spraying means for developing a spray pattern of washing liquid droplets for washing entrained matter from a stream of gas passing upward through said spray pattern, said spraying means disposed above said tank so that said washing liquid droplets fall into said tank;
means for supplying said washing liquid to said spraying means to develop said spray pattern;
a washing chamber defined by vertical walls surrounding said spraying means through which said stream of gas passes;
means for drawing said stream of gas through said spray pattern;
and a confining chamber surrounding said washing chamber and having an inlet for receiving said stream of gas, a sloping ceiling composed of two inclined sheets extending to below said spraying means and joined to the outer surface of said washing chamber and vertical walls extending from said sloping ceiling into said tank, said confining chamber so positioned relative to said washing chamber that the bottom surface of said ceiling guides said stream of gas into said washing chamber and the top surface of said ceiling drains into said tank washing liquid droplets which are carried by said stream of gas out of said washing chamber.

5. Gas washing apparatus comprising:
a tank for holding a washing liquid;
spraying means for developing a spray pattern of washing liquid droplets for washing entrained matter from a stream of gas passing upward through said spray pattern, said spraying means disposed above said tank so that said washing liquid droplets fall into said tank;

means for supplying said washing liquid to said spraying means to develop said spray pattern;

means for drawing said stream of gas through said spray pattern;

a confining chamber surrounding said spraying means and having an inlet for receiving said stream of gas and a sloping ceiling composed of two inclined sheets extending to below said spraying means and forming an outlet for said stream of gas adjacent said spraying means, the ceiling being arranged so that its bottom surface guides said stream of gas into said spray pattern and out through said outlet and its top surface drains into said tank washing liquid droplets which are carried by said stream of gas out of said confining chamber;

and means positioned above said confining chamber for deflecting washing liquid droplets which are carried by said stream of gas out of said confining chamber onto said top surface of said sloping ceiling.

References Cited
UNITED STATES PATENTS

| | | | |
|---|---|---|---|
| 1,614,647 | 1/1927 | Brooks | 261—115 X |
| 1,992,762 | 2/1935 | Pease | 261—89 |
| 2,234,735 | 3/1941 | Lambert et al. | 261—118 X |
| 2,259,626 | 10/1941 | Erikson | 261—117 X |
| 2,685,841 | 8/1954 | Schimpke | 55—230 X |
| 2,757,597 | 8/1956 | Ward et al. | 55—257 X |
| 2,811,258 | 10/1957 | Schleyer et al. | 261—89 X |
| 3,100,809 | 8/1963 | Baker | 261—177 X |
| 3,119,675 | 1/1964 | Gallagher | 261—118 X |
| 3,128,320 | 4/1964 | Umbricht | 261—89 X |

HARRY B. THORNTON, *Primary Examiner.*

T. R. MILES, *Assistant Examiner.*